United States Patent
Ozaki et al.

(10) Patent No.: US 11,646,421 B2
(45) Date of Patent: May 9, 2023

(54) THERMALLY CROSSLINKABLE BINDER AQUEOUS SOLUTION FOR LITHIUM-ION BATTERY, THERMALLY CROSSLINKABLE SLURRY FOR LITHIUM-ION BATTERY NEGATIVE ELECTRODE, NEGATIVE ELECTRODE FOR LITHIUM-ION BATTERY

(71) Applicant: ARAKAWA CHEMICAL INDUSTRIES, LTD., Osaka (JP)

(72) Inventors: Shinji Ozaki, Osaka (JP); Hideki Goda, Osaka (JP); Naoki Sasagawa, Osaka (JP); Satoru Aoyama, Osaka (JP); Katsuya Okubo, Osaka (JP); Katsuhiko Ikeyatsu, Osaka (JP)

(73) Assignee: ARAKAWA CHEMICAL INDUSTRIES, LTD., Osaka (JP)

( * ) Notice: Subject to any disclaimer, the term of this patent is extended or adjusted under 35 U.S.C. 154(b) by 181 days.

(21) Appl. No.: 16/999,030

(22) Filed: Aug. 20, 2020

(65) Prior Publication Data
US 2021/0057748 A1 Feb. 25, 2021

(30) Foreign Application Priority Data
Aug. 22, 2019 (JP) .............................. JP2019-152289

(51) Int. Cl.
| | | |
|---|---|---|
| H01M 4/62 | (2006.01) | |
| C08F 220/28 | (2006.01) | |
| C08F 220/58 | (2006.01) | |
| C08F 220/48 | (2006.01) | |
| C08F 220/56 | (2006.01) | |
| H01M 4/36 | (2006.01) | |
| H01M 4/48 | (2010.01) | |
| H01M 4/587 | (2010.01) | |
| H01M 10/0525 | (2010.01) | |
| H01M 4/02 | (2006.01) | |

(52) U.S. Cl.
CPC ......... *H01M 4/622* (2013.01); *C08F 220/281* (2020.02); *C08F 220/48* (2013.01); *C08F 220/56* (2013.01); *C08F 220/585* (2020.02); *H01M 4/364* (2013.01); *H01M 4/483* (2013.01); *H01M 4/587* (2013.01); *H01M 10/0525* (2013.01); *C08F 2800/10* (2013.01); *H01M 2004/027* (2013.01)

(58) Field of Classification Search
CPC ...... H01M 4/622; H01M 4/364; H01M 4/483; H01M 4/587; H01M 10/0525; H01M 2004/027; H01M 4/0404; H01M 4/139; H01M 4/13; H01M 10/052; H01M 4/0471; C08F 220/281; C08F 220/48; C08F 220/56; C08F 220/585; C08F 2800/10; C08F 220/06; C08F 228/02; Y02E 60/10

See application file for complete search history.

(56) References Cited

U.S. PATENT DOCUMENTS

2017/0062828 A1 3/2017 Sonobe et al.

FOREIGN PATENT DOCUMENTS

| JP | 2004185810 | 7/2004 |
|---|---|---|
| JP | 2005259697 | 9/2005 |
| JP | 2013089437 | 5/2013 |
| JP | 2013168323 | 8/2013 |
| JP | 5390336 | 1/2014 |
| JP | 2014089834 | 5/2014 |
| JP | 2015106488 | 6/2015 |
| JP | 2015118908 | 6/2015 |
| JP | 5903761 | 4/2016 |
| KR | 20110005793 | 1/2011 |
| KR | 20160015222 | 2/2016 |
| KR | 20160102093 | 8/2016 |
| KR | 20190074228 | 6/2019 |
| WO | 2015098507 | 7/2015 |
| WO | 2018008555 | 1/2018 |
| WO | 2016158939 | 2/2018 |

OTHER PUBLICATIONS

English Translation of JP 2013168323 (Year: 2013).*
English Translation of WO 2016158939 (Year: 2016).*
"Office Action of Korea Counterpart Application", dated Apr. 25, 2021, with English translation thereof, p. 1-p. 7.
"Written prior art research report (for priority review) of Korea Counterpart Application", dated Aug. 28, 2020, with English translation thereof, pp. 1-5.
"Search Report of Europe Counterpart Application", dated Jan. 25, 2021, p. 1-p. 6.

* cited by examiner

*Primary Examiner* — Andrew J. Oyer
(74) *Attorney, Agent, or Firm* — JCIPRNET

(57) ABSTRACT

Provided are a thermally crosslinkable binder aqueous solution for a lithium-ion battery, a thermally crosslinkable slurry for a lithium-ion battery negative electrode, a negative electrode for a lithium-ion battery, and a lithium-ion battery. The thermally crosslinkable binder aqueous solution for a lithium-ion battery contains a water-soluble poly(meth)acrylamide (A) and a divalent or higher valent metal ion. The water-soluble poly(meth)acrylamide (A) contains 2 mol % to 60 mol % of a constituent unit derived from a (meth) acrylamide group-containing compound (a), and 10 mol % to 50 mol % of a constituent unit derived from one or more unsaturated acids selected from the group consisting of unsaturated carboxylic acids and unsaturated sulfonic acids or an inorganic salt thereof (b). The divalent or higher valent metal ion is contained in an amount of 0.5 mol % to 30 mol % with respect to 100 mol % of an acid group contained in the component (b).

9 Claims, No Drawings

THERMALLY CROSSLINKABLE BINDER AQUEOUS SOLUTION FOR LITHIUM-ION BATTERY, THERMALLY CROSSLINKABLE SLURRY FOR LITHIUM-ION BATTERY NEGATIVE ELECTRODE, NEGATIVE ELECTRODE FOR LITHIUM-ION BATTERY

CROSS-REFERENCE TO RELATED APPLICATION

This application claims the priority benefit of Japan Application No. 2019-152289, filed on Aug. 22, 2019. The entirety of the above-mentioned patent application is hereby incorporated by reference herein and made a part of this specification.

BACKGROUND

Technical Field

The disclosure relates to a thermally crosslinkable binder aqueous solution for a lithium-ion battery, a thermally crosslinkable slurry for a lithium-ion battery negative electrode, a negative electrode for a lithium-ion battery, and a lithium-ion battery.

Related Art

Lithium-ion batteries have a small size, light weight and high energy density, and further, are repeatedly chargeable and dischargeable, and are used in a wide range of applications. Hence, in recent years, improvements to battery members such as electrodes or the like have been studied with the aim of improving the performance of lithium-ion batteries.

The positive electrode and negative electrode of a lithium-ion battery are both produced in the following manner. A slurry prepared by dispersing an electrode active material and a binder resin in a solvent is applied on both sides of a current collector (for example, a metal foil), and after the solvent is dried and removed to form an electrode layer, the resultant is compression-molded by a roll press machine or the like.

A slurry for a lithium-ion battery mainly contains an active material, a binder and a solvent. Examples of the binder that has been generally used so far include polyvinylidene fluoride (PVDF) as a binder resin to be dissolved in an organic solvent such as N-methyl-2-pyrrolidone (NMP) or the like, and a styrene-butadiene emulsion (SBR latex) as a binder resin for a particulate resin of a water dispersion.

In recent years, in an electrode for a lithium-ion battery, various electrode active materials have been proposed from the viewpoint of increasing battery capacity. However, depending on the electrode active material, the electrode for a lithium-ion battery is likely to expand and contract with charging and discharging. Hence, the electrode for a lithium-ion battery that is likely to expand and contract with charging and discharging undergoes a volume change (springback) from the initial stage of repetition of charging and discharging, and a lithium-ion battery using the above electrode is likely to deteriorate in electrical characteristics such as cycle characteristics or the like.

Therefore, in this field, studies have been made to solve the above problem by binder resins. For example, it has been proposed that good charge and discharge characteristics can be obtained by using polyacrylamide (Patent Documents 1 and 2) as a binder of a water-soluble resin. In addition, with respect to expansion and contraction of an active material associated with charging and discharging, it has been proposed to suppress the expansion by adding a crosslinker to a particulate resin being a binder resin (Patent Document 3). The crosslinker usually causes a crosslinking reaction in the drying step after the slurry composition is applied to the current collector, and forms crosslinks between particles of the particulate resin or the like.

PATENT DOCUMENTS

[Patent Document 1] Japanese Patent Laid-open No. 2015-118908
[Patent Document 2] Japanese Patent Laid-open No. 2015-106488
[Patent Document 3] WO 2015/098507

However, from the viewpoint of ensuring solubility in water, the polyacrylamide of Patent Documents 1 and 2 cannot have such a high molecular weight that the binder resin does not dissolve in water. As a result, there is a problem that the resistance to springback arising from expansion of the active material is not sufficient.

Regarding the use in combination with the crosslinker as described in Patent Document 3, in some cases, even if a large amount of the crosslinker is added, its effect may not be exhibited. In such cases, when a large amount of the crosslinker is added in order to exhibit the effect of the crosslinker, for example, the springback resistance, adhesion of the electrode active material layer to the current collector may instead deteriorate, and desired effects such as high temperature cycle characteristics may not be obtained. Therefore, there is room for further improvement.

Furthermore, a binder composition containing the crosslinker and a particulate binder may deteriorate during a storage period after preparation and before use, and may not exhibit desired performance.

Therefore, problems to be solved by the disclosure include to provide a thermally crosslinkable binder aqueous solution for a lithium-ion battery, the thermally crosslinkable binder aqueous solution imparting good discharge capacity retention rate and springback resistance to a lithium-ion battery, imparting good adhesion to an electrode, and imparting good storage stability to a thermally crosslinkable slurry for a lithium-ion battery negative electrode.

As a result of earnest studies to solve the above problems, the present inventors have found that the above problems can be solved by using a binder aqueous solution containing predetermined amounts of a poly(meth)acrylamide having a predetermined unsaturated monomer as a component and a predetermined metal ion, thereby accomplishing the disclosure.

SUMMARY

The disclosure provides the following items.

Item 1

A thermally crosslinkable binder aqueous solution for a lithium-ion battery, containing: a water-soluble poly(meth)acrylamide (A), containing: 2 mol % to 60 mol % of a constituent unit derived from a (meth)acrylamide group-containing compound (a), and 10 mol % to 50 mol % of a constituent unit derived from one or more unsaturated acids selected from the group consisting of unsaturated carboxylic acids and unsaturated sulfonic acids or an inorganic salt thereof (b); and 0.5 mol % to 30 mol % of a divalent or higher valent metal ion with respect to 100 mol % of an acid group contained in the component (b).

Item 2

The thermally crosslinkable binder aqueous solution for a lithium-ion battery as described in the above Item, wherein the water-soluble poly(meth)acrylamide (A) contains 15 mol % to 75 mol % of a constituent unit derived from a hydroxyl group-containing (meth)acrylic ester (c).

Item 3

The thermally crosslinkable binder aqueous solution for a lithium-ion battery as described in any one of the above Items, wherein the divalent or higher valent metal ion is a calcium ion.

Item 4

A thermally crosslinkable slurry for a lithium-ion battery negative electrode, containing the thermally crosslinkable binder aqueous solution for a lithium-ion battery as described in any one of the above Items and a negative electrode active material.

Item 5

A negative electrode for a lithium-ion battery, obtained by applying the thermally crosslinkable slurry for a lithium-ion battery negative electrode as described in the above Item to a current collector, and drying and curing the same.

Item 6

A lithium-ion battery including the negative electrode for a lithium-ion battery as described in the above Item.

In the disclosure, one or more of the features described above may be provided in combination in addition to the specified combinations.

A thermally crosslinkable binder aqueous solution for a lithium-ion battery according to the disclosure may impart good discharge capacity retention rate and springback resistance to a lithium-ion battery, impart good adhesion to an electrode, and impart good storage stability to a thermally crosslinkable slurry for a lithium-ion battery negative electrode. In addition, a thermally crosslinkable slurry for a lithium-ion battery negative electrode according to the disclosure has excellent storage stability. Furthermore, an electrode according to the disclosure has excellent electrode adhesion. A battery according to the disclosure has excellent discharge capacity retention rate and springback resistance.

DESCRIPTION OF THE EMBODIMENTS

Throughout the disclosure, ranges of numerical values such as physical property values, content and so on may be suitably set (for example, selected from the upper and lower limit values described in each item below). Specifically, regarding a numerical value α, when the upper limit and lower limit of the numerical value α are, for example, A4, A3, A2, A1 (wherein A4>A3>A2>A1) and so on, the numerical value α is in a range of, for example, A4 or less, A3 or less, A2 or less, A1 or more, A2 or more, A3 or more, A1 to A2, A1 to A3, A1 to A4, A2 to A3, A2 to A4, A3 to A4, and so on.

Thermally Crosslinkable Binder Aqueous Solution for Lithium-Ion Battery: also Referred to as Aqueous Solution The disclosure provides a thermally crosslinkable binder aqueous solution for a lithium-ion battery, containing: a water-soluble poly(meth)acrylamide (A) (also referred to as component (A)) containing, 2 mol % to 60 mol % of a constituent unit derived from a (meth)acrylamide group-containing compound (a), and 10 mol % to 50 mol % of a constituent unit derived from one or more unsaturated acids selected from the group consisting of unsaturated carboxylic acids and unsaturated sulfonic acids or an inorganic salt thereof (b); and 0.5 mol % to 30 mol % of a divalent or higher valent metal ion with respect to 100 mol % of an acid group contained in the component (b).

In the disclosure, "water-soluble" means having an insoluble content of less than 0.5% by mass (less than 2.5 mg) when 0.5 g of a compound thereof is dissolved in 100 g of water at 25° C.

In the disclosure, "(meth)acryl" means "at least one selected from the group consisting of acryl and methacryl." Similarly, "(meth)acrylate" means "at least one selected from the group consisting of acrylate and methacrylate." "(Meth)acryloyl" means "at least one selected from the group consisting of acryloyl and methacryloyl."

(Meth)acrylamide Group-Containing Compound (a): also Referred to as Component (a)

In the disclosure, "(meth)acrylamide group-containing compound" means a compound having a (meth)acrylamide group. The (meth)acrylamide group-containing compound may be used singly or in combination of two or more kinds thereof.

In one embodiment, the (meth)acrylamide group-containing compound is expressed by the following structural formula:

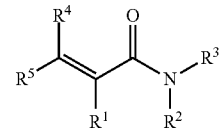

(In the formula, $R^1$ is a hydrogen atom or a methyl group; $R^2$ and $R^3$ are each independently a hydrogen atom, a substituted or unsubstituted alkyl group, or an acetyl group, or a group in which $R^2$ and $R^3$ form a ring structure together; $R^4$ and $R^5$ are each independently a hydrogen atom, a substituted or unsubstituted alkyl group, a hydroxy group, an amino group (—$NR^aR^b$ (wherein $R^a$ and $R^b$ are each independently a hydrogen atom or a substituted or unsubstituted alkyl group), or an acetyl group. Examples of a substituent of the substituted alkyl group include hydroxy group, amino group, acetyl group, and so on. In addition, examples of the group in which $R^2$ and $R^3$ form a ring structure together include morpholyl group, and so on.)

Examples of the alkyl group include linear alkyl group, branched alkyl group, cycloalkyl group, and so on.

The linear alkyl group is expressed by a general formula of —$C_nH_{2n+1}$ (wherein n is an integer of 1 or more). Examples of the linear alkyl group include methyl group, ethyl group, propyl group, n-butyl group, n-pentyl group, n-hexyl group, n-heptyl group, n-octyl group, n-nonyl group, n-decamethyl group, and so on.

The branched alkyl group is a group in which at least one hydrogen of a linear alkyl group is substituted with an alkyl group. Examples of the branched alkyl group include i-propyl group, i-butyl group, s-butyl group, t-butyl group, diethylpentyl group, trimethylbutyl group, trimethylpentyl group, trimethylhexyl group, and so on.

Examples of the cycloalkyl group include monocyclic cycloalkyl group, crosslinked cyclic cycloalkyl group, condensed cyclic cycloalkyl group, and so on.

In the disclosure, "monocyclic" means having a cyclic structure formed by covalent bonding of carbons and without crosslinking structure therein. "Condensed cyclic" means having a cyclic structure in which two or more single rings share two atoms (that is, only one side of each ring is shared (condensed) with each other). "Crosslinked cyclic" means having a cyclic structure in which two or more single rings share three or more atoms.

Examples of the monocyclic cycloalkyl group include cyclopentyl group, cyclohexyl group, cycloheptyl group, cyclodecyl group, 3,5,5-trimethylcyclohexyl group, and so on.

Examples of the crosslinked cyclic cycloalkyl group include tricyclodecyl group, adamantyl group, norbornyl group, and so on.

Examples of the condensed cyclic cycloalkyl group include bicyclodecyl group, and so on.

Examples of the above (meth)acrylamide group-containing compound (a) include (meth)acrylamide, N-isopropyl (meth)acrylamide, N,N-dimethyl(meth)acrylamide, N,N-diethyl(meth)acrylamide, N,N-dimethylaminopropyl(meth)acrylamide, N-methylol(meth)acrylamide, diacetone(meth)acrylamide, maleic acid amide, (meth)acryloylmorpholine, hydroxyethyl(meth)acrylamide, and a salt thereof, and so on. Examples of the above salt include dimethylaminopropyl(meth)acrylamide methyl chloride quaternary salt, dimethylaminoethyl (meth)acrylate benzyl chloride quaternary salt, and so on. Among them, when (meth)acrylamide especially acrylamide is used, a binder can be prepared which not only reduces water absorption while maintaining water solubility, but also reduces irreversible capacity, has a high interaction with an electrode active material, and improves the dispersibility of slurry or the binding property between electrode active materials inside an electrode.

The upper limit and lower limit of the content of a constituent unit derived from the (meth)acrylamide group-containing compound with respect to 100 mol % of all the constituent units of the component (A) are, for example, 60 mol %, 59 mol %, 55 mol %, 50 mol %, 45 mol %, 40 mol %, 35 mol %, 30 mol %, 25 mol %, 20 mol %, 15 mol %, 10 mol %, 9 mol %, 5 mol %, 3 mol %, 2 mol %, and so on. In one embodiment, the above content is preferably 2 mol % to 60 mol %.

The upper limit and lower limit of the content of the constituent unit derived from the (meth)acrylamide group-containing compound with respect to 100% by mass of all the constituent units of the component (A) are, for example, 70% by mass, 65% by mass, 60% by mass, 55% by mass, 50% by mass, 45% by mass, 40% by mass, 35% by mass, 30% by mass, 25% by mass, 20% by mass, 15% by mass, 10% by mass, 9% by mass, 5% by mass, 4% by mass, 2% by mass, 1% by mass, and so on. In one embodiment, the above content is preferably 1% by mass to 70% by mass.

One or More Unsaturated Acids Selected from Group Consisting of Unsaturated Carboxylic Acids and Unsaturated Sulfonic Acids or Inorganic Salt Thereof (b): also Referred to as Component (b)

As the component (b), various known ones may be used without particular limitation, and may be used singly or in combination of two or more thereof. In the disclosure, when a compound A corresponds to both the component (a) and the component (b), the compound A is regarded as the component (b). In the disclosure, an inorganic salt of one or more unsaturated acids selected from the group consisting of unsaturated carboxylic acids and unsaturated sulfonic acids refers to a salt whose cationic moiety is a metal cation.

Examples of the unsaturated carboxylic acid include (meth)acrylic acid, crotonic acid, maleic acid, fumaric acid, itaconic acid, and so on.

Examples of the unsaturated sulfonic acid include: $\alpha,\beta$-ethylenically unsaturated sulfonic acid, such as vinylsulfonic acid, styrenesulfonic acid, (meth)allylsulfonic acid; (meth)acrylamide t-butylsulfonic acid, 2-(meth)acrylamide-2-methylpropanesulfonic acid, 2-(meth)acrylamide-2-hydroxypropanesulfonic acid, 3-sulfopropane(meth)acrylic ester, bis-(3-sulfopropyl)itaconic ester, and so on.

Examples of the inorganic salt include typical metal salt, transition metal salt, and so on.

Examples of the typical metal salt include alkali metal salt, alkaline earth metal salt, group 13 metal salt, and so on.

Examples of the alkali metal salt include lithium salt, sodium salt, potassium salt, and so on.

Examples of the alkaline earth metal salt include magnesium salt, calcium salt, and so on.

Examples of the group 13 metal salt include aluminum salt and so on.

Examples of the transition metal salt include iron salt and so on.

The upper limit and lower limit of the content of the divalent or higher metal ion with respect to 100 mol % of the acid group contained in the component (b) are, for example, 30 mol %, 25 mol %, 20 mol %, 15 mol %, 10 mol %, 9 mol %, 5 mol %, 4 mol %, 2 mol %, 1 mol %, 0.9 mol %, 0.5 mol %, and so on. In one embodiment, the above content is preferably 0.5 mol % to 30 mol %.

In one embodiment, the above divalent or higher valent metal ion is preferably a divalent metal ion, more preferably an alkaline earth metal ion, and even more preferably a calcium ion from the viewpoint of solubility in water.

The upper limit and lower limit of the content of a monovalent metal ion with respect to 100 mol % of the acid group contained in the component (b) are, for example, 99.5 mol %, 99 mol %, 95 mol %, 90 mol %, 85 mol %, 80 mol %, 75 mol %, 70 mol %, 65 mol %, 60 mol %, 55 mol %, 50 mol %, 45 mol %, 40 mol %, 35 mol %, 30 mol %, 25 mol %, 20 mol %, 15 mol %, 10 mol %, and so on. In one embodiment, the above content is preferably 10.0 mol % to 99.5 mol %.

The upper limit and lower limit of the content of the constituent unit derived from one or more unsaturated acids selected from the group consisting of unsaturated carboxylic acids and unsaturated sulfonic acids or an inorganic salt thereof (b) with respect to 100 mol % of all the constituent units of the component (A) are, for example, 50 mol %, 45 mol %, 40 mol %, 35 mol %, 30 mol %, 25 mol %, 20 mol %, 15 mol %, 10 mol %, and so on. In one embodiment, the above content is preferably 10 mol % to 50 mol %.

The upper limit and lower limit of the content of the constituent unit derived from one or more unsaturated acids selected from the group consisting of unsaturated carboxylic acids and unsaturated sulfonic acids or an inorganic salt thereof (b) with respect to 100% by mass of all the constituent units of the component (A) are, for example, 70% by mass, 65% by mass, 60% by mass, 55% by mass, 50% by mass, 45% by mass, 40% by mass, 35% by mass, 30% by mass, 25% by mass, 20% by mass, 15% by mass, 10% by mass, 5% by mass, and so on. In one embodiment, the above content is preferably 5% by mass to 70% by mass.

Hydroxyl Group-Containing (meth)acrylic ester (c): Also Referred to as Component (c)

As the component (c), various known ones may be used without particular limitation, and may be used singly or in combination of two or more thereof. In one embodiment, the hydroxyl group-containing (meth)acrylic ester is preferably hydroxyalkyl(meth)acrylate having a hydroxyalkyl group having 2 to 4 carbon atoms.

In the disclosure, "hydroxyalkyl group having 2 to 4 carbon atoms" refers to a group in which one of hydrogen atoms constituting an alkyl group having 2 to 4 carbon atoms is substituted with a hydroxy group.

Examples of the hydroxyalkyl(meth)acrylate having a hydroxyalkyl group having 2 to 4 carbon atoms include 1-hydroxyethyl(meth)acrylate, 2-hydroxyethyl(meth)acrylate, 1-hydroxypropyl(meth)acrylate, 2-hydroxypropyl(meth)acrylate, 3-hydroxypropyl(meth)acrylate, 2-hydroxy-1-methylethyl(meth)acrylate, 1-hydroxy-2-methylethyl(meth)acrylate, 1-hydroxybutyl(meth)acrylate, 2-hydroxybutyl(meth)acrylate, 3-hydroxybutyl(meth)acrylate, 4-hydroxybutyl(meth)acrylate, 1-hydroxy-1-methyl-propyl(meth)acrylate, 2-hydroxy-1-methyl-propyl(meth)acrylate, 3-hydroxy-1-methyl-propyl(meth)acrylate, 1-ethyl-2-hydroxyethyl(meth)acrylate, 1-hydroxy-2-methyl-propyl(meth)acrylate, 2-hydroxy-2-methyl-propyl(meth)acrylate, 3-hydroxy-2-methyl-propyl(meth)acrylate, 1,1-dimethyl-2-hydroxyethyl(meth)acrylate, and so on.

The upper limit and lower limit of the content of a constituent unit derived from the hydroxyl group-containing (meth)acrylic ester (c) with respect to 100 mol % of all the constituent units of the component (A) are, for example, 75 mol %, 70 mol %, 65 mol %, 60 mol %, 55 mol %, 50 mol %, 45 mol %, 40 mol %, 35 mol %, 30 mol %, 25 mol %, 20 mol %, 17 mol %, 15 mol %, and so on. In one embodiment, the above content is preferably 15 mol % to 75 mol %.

The upper limit and lower limit of the content of the constituent unit derived from the hydroxyl group-containing (meth)acrylic ester (c) with respect to 100% by mass of all the constituent units of the component (A) are, for example, 80% by mass, 75% by mass, 70% by mass, 65% by mass, 60% by mass, 55% by mass, 50% by mass, 45% by mass, 40% by mass, 35% by mass, 30% by mass, 25% by mass, 20% by mass, and so on. In one embodiment, the above content is preferably 20% by mass to 80% by mass.

The upper limit and lower limit of a ratio of amount of substance [amount of substance of component (a)/amount of substance of component (b)] between the component (a) and the component (b) contained in all the constituent units of the component (A) are, for example, 6, 5.5, 5, 4.5, 4, 3.5, 3, 2.5, 2, 1.5, 1, 0.9, 0.5, 0.2, 0.1, 0.09, 0.05, 0.04, and so on. In one embodiment, the above ratio of amount of substance is preferably 0.04 to 6.

The upper limit and lower limit of a ratio of amount of substance [amount of substance of component (a)/amount of substance of component (c)] between the component (a) and the component (c) contained in all the constituent units of the component (A) are, for example, 4, 3, 2.5, 2, 1.5, 1, 0.9, 0.5, 0.2, 0.1, 0.09, 0.05, 0.04, 0.02, and so on. In one embodiment, the above ratio of amount of substance is preferably 0.02 to 4.

The upper limit and lower limit of a ratio of amount of substance [amount of substance of component (b)/amount of substance of component (c)] between the component (b) and the component (c) contained in all the constituent units of the component (A) are, for example, 3.3, 3, 2.5, 2, 1.5, 1, 0.9, 0.5, 0.25, 0.2, 0.15, 0.13, and so on. In one embodiment, the above ratio of amount of substance is preferably 0.13 to 3.3.

The upper limit and lower limit of a mass ratio [mass ratio of component (a)/mass ratio of component (b)] between the component (a) and the component (b) contained in all the constituent units of the component (A) are, for example, 14, 12, 10, 9, 8, 7, 6, 5, 4.5, 4, 3.5, 3, 2.5, 2, 1.5, 1, 0.9, 0.5, 0.25, 0.1, 0.09, 0.05, 0.01, and so on. In one embodiment, the above mass ratio is preferably 0.01 to 14.

The upper limit and lower limit of a mass ratio [mass ratio of component (a)/mass ratio of component (c)] between the component (a) and the component (c) contained in all the constituent units of the component (A) are, for example, 3.5, 3, 2.5, 2, 1.5, 1, 0.9, 0.5, 0.25, 0.1, 0.09, 0.05, 0.01, and so on. In one embodiment, the above mass ratio is preferably 0.01 to 3.5.

The upper limit and lower limit of a mass ratio [mass ratio of component (b)/mass ratio of component (c)] between the component (b) and the component (c) contained in all the constituent units of the component (A) are, for example, 3.5, 3, 2.5, 2, 1.5, 1, 0.9, 0.5, 0.25, 0.2, 0.15, 0.12, 0.1, 0.09, 0.06, and so on. In one embodiment, the above mass ratio is preferably 0.06 to 3.5.

Monomer Other than Component (a), Component (b) and Component (b): also Referred to as Component (d)

In all the constituent units of the component (A), a constituent unit derived from a monomer (component (d)) that does not correspond to any of the component (a), the component (b) and the component (c) may be used as long as the desired effects of the disclosure are not impaired. The component (d) may be used singly or in combination of two or more kinds thereof. Examples of the component (d) include unsaturated phosphoric acid or a salt thereof, a hydroxyl group-free unsaturated carboxylic ester, an α,β-unsaturated nitrile, a conjugated diene, an aromatic vinyl compound, and so on.

Examples of the unsaturated phosphoric acid include vinylphosphonic acid, vinyl phosphate, bis((meth)acryloxyethyl) phosphate, diphenyl-2-(meth)acryloyloxyethyl phosphate, dibutyl-2-(meth)acryloyloxyethyl phosphate, dioctyl-2-(meth)acryloyloxyethyl phosphate, monomethyl-2-(meth)acryloyloxyethyl phosphate, 3-(meth)acryloxy-2-hydroxypropanephosphoric acid, and so on.

The content of a constituent unit derived from the unsaturated phosphoric acid or a salt thereof is not particularly limited, and is preferably less than 40 mol % (for example, less than 30 mol %, less than 20 mol %, less than 19 mol %, less than 15 mol %, less than 10 mol %, less than 5 mol %, less than 1 mol %, or 0 mol %) with respect to 100 mol % of all the constituent units of the component (A), considering a reaction with the above component (b).

The content of a constituent unit derived from the unsaturated phosphoric acid or a salt thereof with respect to 100% by mass of all the constituent units of the component (A) is preferably less than 40% by mass (for example, less than 30% by mass, less than 20% by mass, less than 19% by mass, less than 15% by mass, less than 10% by mass, less than 5% by mass, less than 1% by mass, or 0% by mass).

The hydroxyl group-free unsaturated carboxylic ester is preferably a hydroxyl group-free (meth)acrylic ester. Examples of the hydroxyl group-free (meth)acrylic ester include a hydroxyl group-free linear (meth)acrylic ester, a hydroxyl group-free branched (meth)acrylic ester, a hydroxyl group-free alicyclic (meth)acrylic ester, a hydroxyl group-free substituted (meth)acrylic ester, and so on.

Examples of the hydroxyl group-free linear (meth)acrylic ester include methyl (meth)acrylate, ethyl (meth)acrylate, n-propyl (meth)acrylate, n-butyl (meth)acrylate, n-amyl (meth)acrylate, hexyl (meth)acrylate, n-octyl (meth)acrylate, nonyl (meth)acrylate, decyl (meth)acrylate, and so on.

Examples of the hydroxyl group-free branched (meth) acrylic ester include i-propyl (meth)acrylate, i-butyl (meth) acrylate, i-amyl (meth)acrylate, 2-ethylhexyl (meth)acrylate, and so on.

Examples of the hydroxyl group-free alicyclic (meth) acrylic ester include cyclohexyl (meth)acrylate, and so on.

The content of a constituent unit derived from the hydroxyl group-free unsaturated carboxylic ester is not particularly limited. Nevertheless, by use of the hydroxyl group-free unsaturated carboxylic ester, curling of an electrode due to a lowered glass transition temperature of the component (A) can be suppressed. On the other hand, considering the springback resistance of the lithium-ion battery, the content of the constituent unit derived from the hydroxyl group-free unsaturated carboxylic ester is preferably less than 40 mol % (for example, less than 30 mol %, less than 20 mol %, less than 19 mol %, less than 15 mol %, less than 10 mol %, less than 5 mol %, less than 1 mol %, or 0 mol %) with respect to 100 mol % of all the constituent units of the component (A).

In one embodiment, the content of the constituent unit derived from the hydroxyl group-free unsaturated carboxylic ester with respect to 100% by mass of all the constituent units of the component (A) is preferably less than 40% by mass (for example, less than 30% by mass, less than 20% by mass, less than 19% by mass, less than 15% by mass, less than 10% by mass, less than 5% by mass, less than 1% by mass, or 0% by mass).

Examples of the α,β-unsaturated nitrile include (meth) acrylonitrile, α-chloro(meth)acrylonitrile, α-ethyl(meth) acrylonitrile, vinylidene cyanide, and so on. Among them, (meth)acrylonitrile is preferable, and acrylonitrile is particularly preferable.

The α,β-unsaturated nitrile can be suitably used for the purpose of imparting flexibility to an electrode. The content of a constituent unit derived from the α,β-unsaturated nitrile is not particularly limited, and is preferably less than 40 mol % (for example, less than 30 mol %, less than 20 mol %, less than 19 mol %, less than 15 mol %, less than 10 mol %, less than 5 mol %, less than 1 mol %, or 0 mol %) with respect to 100 mol % of all the constituent units of the component (A). Since the content is less than 40 mol % with respect to 100 mol % of all the constituent units of the component (A), while the solubility of the component (A) in water is maintained, an electrode layer of the above slurry becomes uniform and is likely to exhibit flexibility.

In one embodiment, the content of the constituent unit derived from the α,β-unsaturated nitrile with respect to 100% by mass of all the constituent units of the component (A) is preferably less than 40% by mass (for example, less than 30% by mass, less than 20% by mass, less than 19% by mass, less than 15% by mass, less than 10% by mass, less than 5% by mass, less than 1% by mass, or 0% by mass).

Examples of the conjugated diene include 1,3-butadiene, 2-methyl-1,3-butadiene, 2,3-dimethyl-1,3-butadiene, 2-chloro-1,3-butadiene, a substituted linear conjugated pentadiene, a substituted and side chain conjugated hexadiene, and so on.

The content of a constituent unit derived from the conjugated diene is not particularly limited, and is preferably less than 10 mol %, more preferably 0 mol %, with respect to 100 mol % of all the constituent units of the component (A), from the viewpoint of springback resistance of the lithium-ion battery.

In one embodiment, the content of the constituent unit derived from the conjugated diene with respect to 100% by mass of all the constituent units of the component (A) is preferably less than 10% by mass, more preferably 0% by mass.

In addition, examples of the aromatic vinyl compound include styrene, α-methylstyrene, p-methylstyrene, vinyltoluene, chlorostyrene, divinylbenzene, and so on.

The content of a constituent unit derived from the aromatic vinyl compound is not particularly limited, and is preferably less than 10 mol %, more preferably 0 mol %, with respect to 100 mol % of all the constituent units of the component (A), from the viewpoint of springback resistance of the lithium-ion battery. Moreover, in one embodiment, the component (A) has ho aromatic ring group.

In one embodiment, the content of the constituent unit derived from the aromatic vinyl compound with respect to 100% by mass of all the constituent units of the component (A) is preferably less than 10% by mass, more preferably 0% by mass.

A ratio of a constituent unit derived from the component (d) other than the above unsaturated phosphoric acid or a salt thereof, hydroxyl group-free unsaturated carboxylic ester, α,β-unsaturated nitrile, conjugated diene and aromatic vinyl compound to all the constituent units of the component (A) is less than 10 mol %, less than 5 mol %, less than 1 mol %, less than 0.1 mol %, less than 0.01 mol %, or 0 mol %, with respect to 100 mol % of all the constituent units of the component (A), and is less than 10% by mass, less than 5% by mass, less than 1% by mass, less than 0.5% by mass, less than 0.1% by mass, less than 0.01% by mass, or 0% by mass, with respect to 100% by mass of all the constituent units of the component (A).

A method for introducing a divalent or higher valent metal ion into the water-soluble poly(meth)acrylamide (A) may be either of the following: (1) an introduction method in which all the constituent units of the component (A) containing the (meth)acrylamide group-containing compound (a), unsaturated carboxylic acid and unsaturated sulfonic acid are polymerized to prepare the water-soluble poly(meth)acrylamide (A), and the water-soluble poly(meth)acrylamide (A) is then neutralized with a salt of a divalent or higher valent metal ion; and (2) a method in which all the constituent units of the component (A) containing the (meth)acrylamide group-containing compound (a), unsaturated carboxylic acid, and a salt of a divalent or higher valent metal ion of unsaturated sulfonic acid are polymerized to prepare the water-soluble poly(meth)acrylamide (A).

Examples of the above salt of a divalent or higher valent metal ion include divalent or higher valent typical metal salt, divalent or higher valent transition metal salt, and so on.

Examples of the divalent or higher valent typical metal salt include alkaline earth metal salt, group 13 metal salt, and so on.

Examples of the alkaline earth metal salt include magnesium salt, calcium salt, and so on.

Examples of the magnesium salt include magnesium hydroxide, magnesium chloride, magnesium fluoride, magnesium bromide, magnesium acetate, magnesium sulfate, magnesium carbonate, magnesium phosphate, magnesium hydrogen carbonate, and so on.

Examples of the calcium salt include calcium hydroxide, calcium chloride, calcium fluoride, calcium bromide, calcium acetate, calcium sulfate, calcium carbonate, calcium phosphate, calcium hydrogen carbonate, and so on.

Examples of the group 13 metal salt include aluminum salt and so on.

Examples of the aluminum salt include aluminum hydroxide, aluminum chloride, aluminum fluoride, aluminum bromide, aluminum acetate, aluminum sulfate, aluminum phosphate, aluminum carbonate, and so on.

Examples of the transition metal salt include iron salt and so on.

Examples of the iron salt include iron hydroxide, iron chloride, iron fluoride, iron bromide, iron acetate, iron sulfate, iron phosphate, iron carbonate, and so on.

In one embodiment, the above divalent or higher valent metal salt is preferably divalent metal salt, more preferably alkaline earth metal salt, and even more preferably calcium salt from the viewpoint of solubility in water.

A carboxylic acid group or sulfonic acid group of the water-soluble poly(meth)acrylamide (A) and the metal ion are in an ionized state in a slurry. On the other hand, in a process of drying the water after applying the slurry to a metal foil, as the water decreases, the acid group and the metal ion interact with each other (to form an ion complex), and the acid group forms a metal salt after the water is dried. In the drying step, the water is not volatilized from a contact surface with a copper foil and is unilaterally volatilized from an air-facing surface. Generally, when a water-soluble polymer is used in a binder, the drying of water causes the polymer to move (migrate) to the air-facing surface side and to be reduced on the copper foil side, with the result that the adhesion of the copper foil-facing surface deteriorates. In the case where the acid group is neutralized with a divalent or higher valent metal ion as in the disclosure, when the concentration is increased during the drying, the ion complex is formed, and the polymers form a network by cross-linking of metal ions. Therefore, the above-described migration is unlikely to occur.

The above is only one theory, and the disclosure is not intended to be bound by the above theory.

Method for Preparing Component (A)

The component (A) may be synthesized by various known polymerization methods, preferably a radical polymerization method. Specifically, it is preferable to add a radical polymerization initiator and, if necessary, a chain transfer agent, to a monomer mixture containing the aforementioned components, and, while stirring the mixture, perform a polymerization reaction at a reaction temperature of 50° C. to 100° C. The reaction time is not particularly limited and is preferably 1 hour to 10 hours.

As the radical polymerization initiator, various known ones may be used without particular limitation. Examples of the radical polymerization initiator include: a persulfate, such as potassium persulfate and ammonium persulfate or the like; a redox polymerization initiator in which the above persulfate and a reductant such as sodium bisulfite or the like are combined; an azo initiator, such as 2,2'-azobis-2-amidinopropane dihydrochloride or the like, and so on. The amount of the radical polymerization initiator used is not particularly limited, and is preferably 0.05% by mass to 5.0% by mass, more preferably 0.1% by mass to 3.0% by mass, with respect to 100% by mass of the monomer group that provides the component (A).

Before the radical polymerization reaction and/or when the obtained component (A) is dissolved in water, for the purpose of improving production stability, the pH of a reaction solution may be adjusted by a general neutralizer such as ammonia or organic amine, potassium hydroxide, sodium hydroxide, lithium hydroxide or the like. In this case, the pH is preferably 2 to 11. For the same purpose, it is also possible to use ethylene diamine tetraacetic acid (EDTA), which is a metal ion sealant, or a salt thereof, or the like.

Physical Properties of Component (A)

The upper limit and lower limit of a glass transition temperature of the component (A) are, for example, 160° C., 155° C., 150° C., 145° C., 140° C., 135° C., 130° C., 125° C., 120° C., 115° C., 110° C., 105° C., 100° C., 95° C., 90° C., 85° C., 80° C., 75° C., 70° C., 65° C., 60° C., 55° C., 50° C., 45° C., 40° C., 35° C., 30° C., 25° C., 20° C., 15° C., 10° C., 5° C., 0° C., and so on. In one embodiment, 0° C. or higher is preferable, and 30° C. or higher is more preferable from the viewpoints of mechanical strength and heat resistance.

The glass transition temperature of the component (A) may be adjusted by a combination of monomers. The glass transition temperature of the component (A) can be calculated from glass transition temperatures (Tg) (absolute temperature: K) of homopolymers of the monomers and mass fractions thereof based on the Fox equation shown below.

$$1/Tg = (W_1/Tg_1) + (W_2/Tg_2) + (W_3/Tg_3) + \ldots + (W_n/Tg_n)$$

[In the equation, Tg indicates the glass transition temperature (K) of the polymer to be calculated, $W_1$ to $W_n$ each indicate a mass fraction of each monomer, and $Tg_1$ to $Tg_n$ each indicate the glass transition temperature (K) of a homopolymer of each monomer.]

For example, the glass transition temperature is 165° C. in the case of a homopolymer of acrylamide, is 106° C. in the case of a homopolymer of acrylic acid, is −15° C. in the case of a homopolymer of hydroxyethyl acrylate, and is 105° C. in the case of a homopolymer of acrylonitrile. In order to obtain the component (A) having a desired glass transition temperature, the monomer composition constituting the component (A) can be determined. Moreover, the glass transition temperature of a homopolymer of a monomer can be measured by a differential scanning calorimeter (DSC), a differential thermal analyzer (DTA), a thermomechanical measurement apparatus (TMA) or the like under the condition that the temperature is raised from −100° C. to 300° C. (at a temperature rising rate of 10° C./min). Moreover, values described in a literature may also be used. Examples of the literature include page 325 of "Handbook of Chemistry: Pure Chemistry II" (Revised 5th Edition) edited by the Chemical Society of Japan, and so on.

While a gel fraction of a cured product of the component (A) is not particularly limited, the upper limit and lower limit of the gel fraction of the cured product of the component (A) are, for example, 99.9%, 95%, 90%, 85%, 80%, 75%, 70%, 65%, 60%, 55%, 50%, 45%, 40%, 35%, 30%, 25%, 20%, and so on. In one embodiment, 20% or more is preferable, and 25% or more is more preferable, from the viewpoint of the effect of exhibiting the springback resistance associated with a charge and discharge cycle.

Moreover, the gel fraction of the cured product of the component (A) is a value calculated by the following equation:

Gel fraction (%)={insoluble residue (g) in water/ mass (g) of solid resin}×100

In one embodiment, curing conditions of the above cured product are, for example, 120° C. for 4 hours, and so on.

The above gel fraction is measured as follows, for example. A thermally crosslinkable binder aqueous solution for a lithium-ion battery in an appropriate amount (for example, 10 g), which contains the water-soluble poly(meth)acrylamide (A), is put in an appropriate container (for example, an ointment can (product name "Ointment Can made of tinplate" made by SOGO LABORATORY GLASS WORKS CO., LTD.)), and after drying under appropriate drying conditions (for example, at 120° C. for 4 hours by a circulating air dryer (product name "Blower Constant Temperature Dryer DSR420DA" made by Advantec Toyo Kaisha, Ltd.)), a solid resin after thermal crosslinking is obtained. The mass of the solid resin is accurately measured at 25° C. by an appropriate mass meter (for example, "Standard Balance CPA324S" (product name) made by Sartorius Japan K.K.). The measured solid resin is transferred to an appropriate container (for example, a 300 mL beaker) containing pure water in an appropriate amount (for example, 150 mL), and after immersion in water under appropriate conditions (for example, at 25° C. for 3 hours) under stirring by an appropriate magnetic stirrer (for example, "Powerful Magnetic Stirrer RCX-1000D" (product name) made by Tokyo Rikakikai Co., Ltd.), the resultant is filtered under reduced pressure by an appropriate tool (for example, filter paper ("No. 50B" made by Kiriyama Glass Works Co.), and using a Kiriyama funnel (product name "KIRIYAMA ROHTO SB-60" made by Kiriyama Glass Works Co.) and a suction bell (product name "Suction Bell VKB-200" made by Kiriyama Glass Works Co.)). After that, an insoluble residue remaining on the filter paper is dried under appropriate conditions (for example, at 120° C. for 3 hours) by an appropriate dryer (for example, the above circulating air dryer), followed by an accurate measurement of the mass of the insoluble residue by an appropriate mass meter (for example, the above mass meter) at an appropriate temperature (for example, 25° C.), and a gel fraction of the resin after thermal crosslinking of the water-soluble binder for a battery is calculated from the above equation.

Thermal crosslinking of the water-soluble poly(meth)acrylamide (A) is considered to be caused by an amide group derived from the (meth)acrylamide group-containing compound (a) and a hydroxyl group derived from the hydroxyl group-containing (meth)acrylic ester (c). A molar ratio (amide group/hydroxyl group) between the amide group and the hydroxyl group in the water-soluble poly(meth)acrylamide (A) is not particularly limited, and the amide group is preferably in excess. The upper limit and lower limit of the molar ratio (amide group/hydroxyl group) between the amide group and the hydroxyl group are, for example, 19, 18, 17.5, 15, 12.5, 10, 9, 7.5, 5, 2.5, 1.2, 1.0, and so on. In one embodiment, the amide group to hydroxyl group molar ratio is preferably 1.0 to 19.0, more preferably 1.2 to 18.0. It is conceivable that the effect of exhibiting the springback resistance associated with a charge and discharge cycle can be achieved by satisfying the above without losing the adhesion of the active material layer to the current collector. However, the disclosure is not intended to be limited thereto.

A weight average molecular weight (Mw) of the component (A) is not particularly limited, and its upper limit and lower limit are, for example, 7,000,000, 6,500,000, 6,000,000, 5,500,000, 5,000,000, 4,500,000, 4,000,000, 3,500,000, 3,000,000, 2,500,000, 2,000,000, 1,500,000, 1,000,000, 950,000, 900,000, 850,000, 800,000, 750,000, 700,000, 650,000, 600,000, 550,000, 500,000, 450,000, 400,000, 350,000, 300,000, and so on. In one embodiment, from the viewpoint of dispersion stability of the above slurry, 300,000 to 7,000,000 is preferable, and 350,000 to 6,000,000 is more preferable.

A number average molecular weight (Mn) of the component (A) is not particularly limited, and its upper limit and lower limit are, for example, 6,000,000, 5,500,000, 5,000,000, 4,500,000, 4,000,000, 3,500,000, 3,000,000, 2,500,000, 2,000,000, 1,500,000, 1,000,000, 950,000, 900,000, 850,000, 800,000, 750,000, 700,000, 650,000, 600,000, 550,000, 500,000, 450,000, 400,000, 300,000, 200,000, 100,000, 50,000, 10,000, and so on. In one embodiment, the number average molecular weight (Mn) of the component (A) is preferably 10,000 or more.

The weight average molecular weight and the number average molecular weight may be calculated, for example, as values in terms of polyacrylic acid as measured by gel permeation chromatography (GPC) in an appropriate solvent.

The upper limit and lower limit of a molecular weight distribution (Mw/Mn) of the component (A) are, for example, 15, 14, 13, 11, 10, 9, 7.5, 5, 4, 3, 2.9, 2.5, 2, 1.5, 1.1, and so on. In one embodiment, the molecular weight distribution (Mw/Mn) of the component (A) is preferably 1.1 to 15.

B-type viscosity of an aqueous solution containing 13% by mass of the component (A) is not particularly limited, and its upper limit and lower limit are, for example, 100,000 mPa·s, 90,000 mPa·s, 80,000 mPa·s, 70,000 mPa·s, 60,000 mPa·s, 50,000 mPa·s, 40,000 mPa·s, 30,000 mPa·s, 20,000 mPa·s, 10,000 mPa·s, 9,000 mPa·s, 8,000 mPa·s, 7,000 mPa·s, 6,000 mPa·s, 5,000 mPa·s, 4,000 mPa·s, 3,000 mPa·s, 2,000 mPa·s, 1,000 mPa·s, and so on. In one embodiment, the above B-type viscosity preferably ranges from 1,000 mPa·s to 100,000 mPa·s.

The B-type viscosity is measured by a B-type viscometer such as "B-type Viscometer Model BM" (product name) made by Toki Sangyo Co., Ltd.

The upper limit and lower limit of the pH of the thermally crosslinkable binder aqueous solution for a lithium-ion battery are, for example, 7, 6.9, 6.5, 6, 5.9, 5.6, 5.5, 5.4, 5.2, 5.1, 5, and so on. In one embodiment, the pH of the thermally crosslinkable binder aqueous solution for a lithium-ion battery is preferably 5 to 7 and more preferably 5 or higher and lower than 7 from the viewpoint of solution stability. From the viewpoint of preventing deterioration of dispersibility of slurry and Coulombic efficiency, the pH is preferably 5 or higher; from the viewpoint of preventing deterioration of flexibility, the pH is preferably 7 or lower.

The pH may be measured at 25° C. using a glass electrode pH meter (for example, "Handy pH Meter D-52" (product name) made by Horiba, Ltd.).

The upper limit and lower limit of the content of the water-soluble poly(meth)acrylamide (A) with respect to 100% by mass of the thermally crosslinkable binder aqueous solution for a lithium-ion battery are, for example, 20% by mass, 19% by mass, 15% by mass, 14% by mass, 12% by mass, 10% by mass, 9% by mass, 7% by mass, 6% by mass, 5% by mass, and so on. In one embodiment, the content of the water-soluble poly(meth)acrylamide (A) with respect to 100% by mass of the thermally crosslinkable binder aqueous solution for a lithium-ion battery is preferably 5% by mass to 20% by mass.

The upper limit and lower limit of the content of water with respect to 100% by mass of the thermally crosslinkable binder aqueous solution for a lithium-ion battery are, for example, 95% by mass, 90% by mass, 85% by mass, 80% by mass, and so on. In one embodiment, the content of the water with respect to 100% by mass of the thermally crosslinkable binder aqueous solution for a lithium-ion battery is preferably 80% by mass to 95% by mass.

The upper limit and lower limit of a mass ratio [mass of component (A)/mass of water] between the component (A) and the water contained in the thermally crosslinkable binder aqueous solution for a lithium-ion battery are, for example, 0.25, 0.2, 0.15, 0.1, 0.05, and so on. In one embodiment, the mass ratio between the component (A) and the water contained in the thermally crosslinkable binder aqueous solution for a lithium-ion battery is preferably 0.05 to 0.25.

Dispersion (Emulsion)

In one embodiment, the above thermally crosslinkable binder aqueous solution for a lithium-ion battery contains a dispersion (emulsion).

Examples of the dispersion (emulsion) include styrene-butadiene-based copolymer latex, polystyrene-based polymer latex, polybutadiene-based polymer latex, acrylonitrile-butadiene-based copolymer latex, polyurethane-based polymer latex, polymethylmethacrylate-based polymer latex, methylmethacrylate-butadiene-based copolymer latex, polyacrylate-based polymer latex, vinyl chloride-based polymer latex, vinyl acetate-based polymer emulsion, vinyl acetate-ethylene-based copolymer emulsion, polyethylene emulsion, carboxy-modified styrene-butadiene copolymer resin emulsion, acrylic resin emulsion, polyethylene, polypropylene, polyethylene terephthalate, polyamide (PA), polyimide (PI), polyamide-imide (PAI), an aromatic polyamide, alginic acid and a salt thereof, polyvinylidene fluoride (PVDF), polytetrafluoroethylene (PTFE), a tetrafluoroethylene-hexafluoropropylene copolymer (FEP), a tetrafluoroethylene-perfluoroalkyl vinyl ether copolymer (PFA), an ethylene tetrafluoroethylene (ETFE) copolymer, and so on.

The upper limit and lower limit of the content of the dispersion (emulsion) with respect to 100% by mass of the component (A) are, for example, 100% by mass, 95% by mass, 90% by mass, 85% by mass, 80% by mass, 75% by mass, 70% by mass, 65% by mass, 60% by mass, 55% by mass, 50% by mass, 45% by mass, 40% by mass, 35% by mass, 30% by mass, 25% by mass, 20% by mass, 19% by mass, 17% by mass, 15% by mass, 13% by mass, 10% by mass, 9% by mass, 7% by mass, 5% by mass, 4% by mass, 2% by mass, 1% by mass, 0% by mass, and so on. In one embodiment, the above content is preferably 0% by mass to 100% by mass from the viewpoints of electrode flexibility and discharge capacity retention rate.

Thickener

In one embodiment, the above thermally crosslinkable binder aqueous solution for a lithium-ion battery contains a thickener.

Examples of the thickener include: a cellulosic polymer, such as carboxymethyl cellulose, methyl cellulose, hydroxypropyl cellulose or the like, as well as an ammonium salt and an alkali metal salt thereof; (modified) poly(meth)acrylic acid as well as an ammonium salt and an alkali metal salt thereof; polyvinyl alcohols, such as (modified) polyvinyl alcohol, a copolymer of acrylic acid or acrylate and vinyl alcohol, a copolymer of maleic anhydride, maleic acid, or fumaric acid and vinyl alcohol; polyethylene glycol, polyethylene oxide, polyvinylpyrrolidone, modified polyacrylic acid, oxidized starch, phosphoric acid starch, casein, various modified starches, an acrylonitrile-butadiene copolymer hydride, and so on.

The upper limit and lower limit of the content of the thickener with respect to 100% by mass of the component (A) are, for example, 50% by mass, 45% by mass, 40% by mass, 35% by mass, 30% by mass, 25% by mass, 20% by mass, 19% by mass, 17% by mass, 15% by mass, 13% by mass, 10% by mass, 9% by mass, 7% by mass, 5% by mass, 4% by mass, 2% by mass, 1% by mass, 0% by mass, and so on. In one embodiment, the above content is preferably 0% by mass to 50% by mass.

Additive

The thermally crosslinkable binder aqueous solution for a lithium-ion battery may contain, as an additive, an agent that does not correspond to any of the component (A), water, the dispersion (emulsion) and the thickener. Examples of the additive include a dispersant, a leveling agent, an antioxidant, a particulate polymer, a crosslinker, a hydroxysilyl compound, and so on. The content of the additive is, for example, 0% by mass to 5% by mass, less than 1% by mass, less than 0.1% by mass, less than 0.01% by mass, or the like, with respect to 100% by mass of the component (A), and is, for example, 0% by mass to 5% by mass, less than 1% by mass, less than 0.1% by mass, less than 0.01% by mass, 0% by mass, or the like, with respect to 100% by mass of the aqueous solution.

Examples of the dispersant include an anionic dispersant, a cationic dispersant, a nonionic dispersant, a polymer dispersant, and so on.

Examples of the leveling agent include a surfactant, such as an alkyl-based surfactant, a silicon-based surfactant, a fluorine-based surfactant, a metal-based surfactant or the like, and so on. By using the surfactant, cissing that occurs during coating may be prevented and smoothness of the above slurry layer (coating layer) may be improved.

Examples of the antioxidant include a phenol compound, a hydroquinone compound, an organophosphorus compound, a sulfur compound, a phenylenediamine compound, a polymer type phenol compound, and so on. The polymer type phenol compound is a polymer having a phenol structure in a molecule. A weight average molecular weight of the polymer type phenol compound is preferably 200 to 1,000, more preferably 600 to 700.

Examples of the crosslinker include formaldehyde, glyoxal, hexamethylenetetramine, urea formaldehyde resin, methylol melamine resin, a carbodiimide compound, a polyfunctional epoxy compound, an oxazoline compound, a polyfunctional hydrazide compound, an isocyanate compound, a melamine compound, an urea compound, and a mixture thereof.

A hydroxysilyl compound means a compound having a structure in which a hydroxy group (—OH) is directly bonded to a silicon atom. A trihydroxysilyl compound means a compound having a trihydroxysilyl group (—Si(OH)$_3$). A tetrahydroxysilyl compound means a compound represented by Si(OH)$_4$. In one embodiment, the trihydroxysilyl compound is a compound represented by the following general formula:

(In the formula, R represents substituted or unsubstituted alkyl group, vinyl group, or (meth)acryloxy group, and examples of the above substituent include amino group, mercapto group, glycidoxy group, (meth)acryloxy group, epoxy group, and so on.) The hydroxysilyl compound is preferably prepared by hydrolyzing a silane coupling agent or tetraalkoxysilane. The hydroxysilyl compound may be partially polycondensed without losing water solubility. As the silane coupling agent, a commonly used silane coupling agent may be used. The silane coupling agent is not particularly limited. The hydroxysilyl compound prepared from the silane coupling agent may be used singly or in combination of two or more kinds thereof. In one embodiment, the hydroxysilyl compound contains trihydroxysilylpropylamine. Examples of trialkoxysilanes include 3-aminopropyltrimethoxysilane, 3-aminopropyltriethoxysilane, N-2-(aminoethyl)3-aminopropyltrimethoxysilane, N-2-(aminoethyl)3-aminopropyltriethoxysilane, 3-triethoxysilyl-N-(1,3-dimethyl-butylidene)propylamine, N-phenyl-3-aminopropyltrimethoxysilane, 3-mercaptopropyltrimethoxysilane, 3-isocyanatepropyltriethoxysilane, vinyltrimethoxysilane, vinyltriethoxysilane, 3-methacryloxypropyltrimethoxysilane, 3-methacryloxypropyltriethoxysilane, 3-acryloxypropyltrimethoxysilane, tetrahydroxysilane, and so on. Examples of the tetraalkoxysilane include tetramethoxysilane, a tetramethoxysilane oligomer, tetraethoxysilane, a tetraethoxysilane oligomer, and so on. Among them, the hydroxysilyl compound is preferably prepared using 3-aminopropyltrimethoxysilane from the viewpoints of stability and resistance to electrolytic solution.

Examples of the additive other than those mentioned above include at least one compound selected from the group consisting of unsaturated carboxylic acids, unsaturated amides, and salts thereof.

The above thermally crosslinkable binder aqueous solution for a lithium-ion battery may be used as a thermally crosslinkable binder aqueous solution for a lithium-ion battery negative electrode.

Thermally Crosslinkable Slurry for Lithium-Ion Battery Negative Electrode: also Referred to as Slurry The disclosure provides a thermally crosslinkable slurry for a lithium-ion battery negative electrode, the thermally crosslinkable slurry containing the above thermally crosslinkable binder aqueous solution for a lithium-ion battery and a negative electrode active material.

In the disclosure, "slurry" means a suspension of liquid and solid particles.

The upper limit and lower limit of the pH of the thermally crosslinkable slurry for a lithium-ion battery negative electrode are, for example, 7, 6.9, 6.5, 6, 5.9, 5.6, 5.5, 5.4, 5.2, 5.1, 5, and so on. In one embodiment, the pH of the thermally crosslinkable slurry for a lithium-ion battery negative electrode is preferably 5 to 7 and more preferably 5 or higher and lower than 7 from the viewpoint of solution stability. From the viewpoint of preventing deterioration of dispersibility of slurry and Coulombic efficiency, the pH is preferably 5 or higher; from the viewpoint of preventing deterioration of flexibility, the pH is preferably 7 or lower.

Negative Electrode Active Material

The negative electrode active material may be used singly or in combination of two or more kinds thereof.

The negative electrode active material is not particularly limited as long as being capable of reversibly occluding and releasing lithium, and an appropriate material may be suitably selected depending on the type of the target lithium-ion battery. Examples of the negative electrode active material include a carbon material, as well as a material alloyable with lithium, such as a silicon material, a lithium atom-containing oxide, a lead compound, a tin compound, an arsenic compound, an antimony compound, an aluminum compound or the like, and so on.

Since the carbon material or the material alloyable with lithium has a large volume expansion rate when the battery is charged, the effect of the disclosure may be remarkably exhibited.

Examples of the above carbon material include graphite (for example, natural graphite, artificial graphite or the like) which is highly crystalline carbon, low crystalline carbon (such as soft carbon, hard carbon or the like), carbon black (such as Ketjen black, acetylene black, channel black, lamp black, oil furnace black, thermal black or the like), a fullerene, a carbon nanotube, a carbon nanofiber, a carbon nanohorn, a carbon fibril, mesocarbon microbeads (MCMB), a pitch-based carbon fiber, and so on.

Examples of the above silicon material include, in addition to silicon, silicon oxide and silicon alloy, silicon oxide composites expressed by SiC, SiO$_x$C$_y$ (wherein 0<x≤3, and 0<y≤5), Si$_3$N$_4$, Si$_2$N$_2$O, and SiO$_x$ (wherein 0<x≤2) (for example, materials described in Japanese Patent Laid-Open Nos. 2004-185810 and 2005-259697 and so on), a silicon material described in Japanese Patent Laid-Open No. 2004-185810, and so on. In addition, silicon materials described in Japanese Patent Nos. 5390336 and 5903761 may also be used.

The above silicon oxide is preferably a silicon oxide expressed by a composition formula SiO$_x$ (wherein 0<x<2, preferably 0.1≤x≤1).

The above silicon alloy is preferably an alloy of silicon and at least one transition metal selected from the group consisting of titanium, zirconium, nickel, copper, iron and molybdenum. Silicon alloys of these transition metals are preferable due to high electronic conductivity and high strength. The silicon alloy is more preferably a silicon-nickel alloy or a silicon-titanium alloy, particularly preferably a silicon-titanium alloy. A content ratio of silicon in the silicon alloy is preferably 10 mol % or more, more preferably 20 mol % to 70 mol %, with respect to 100 mol % of metal elements in the above silicon alloy. The silicon material may be single crystalline, polycrystalline, or amorphous.

When the silicon material is used as the negative electrode active material, a negative electrode active material other than the silicon material may be used together. Examples of such a negative electrode active material include the above carbon material; a conductive polymer such as polyacene or the like; a composite metal oxide expressed by A$_X$B$_Y$O$_Z$ (wherein A represents an alkali metal or a transition metal, B represents at least one selected from transition metals such as cobalt, nickel, aluminum, tin, manganese or the like, O represents an oxygen atom, and X, Y, and Z are respectively numbers in the following ranges: 0.05<X<1.10, 0.85<Y<4.00 and 1.5<Z<5.00), or other metal oxide, and so on. When the silicon material is used as the negative electrode active material, it is preferable to use a carbon material together because a volume change associated with the occlusion and release of lithium is small.

Examples of the above lithium atom-containing oxide include a ternary nickel cobalt lithium manganate, and a lithium-transition metal composite oxide, such as a lithium-manganese composite oxide (such as $LiMn_2O_4$ or the like), a lithium-nickel composite oxide (such as $LiNiO_2$ or the like), a lithium-cobalt composite oxide (such as $LiCoO_2$ or the like), a lithium-iron composite oxide (such as $LiFeO_2$ or the like), a lithium-nickel-manganese composite oxide (such as $LiNi_{0.5}Mn_{0.5}O_2$ or the like), a lithium-nickel-cobalt composite oxide (such as $LiNi_{0.8}Co_{0.2}O_2$ or the like), a lithium-transition metal phosphate compound (such as $LiFePO_4$ or the like), a lithium-transition metal sulfate compound (such as $Li_xFe_2(SO_4)_3$), a lithium-titanium composite oxide (such as lithium titanate: $Li_4Ti_5O_{12}$) or the like, other conventionally known negative electrode active material, and so on.

The shape of the negative electrode active material is not particularly limited and may be an arbitrary shape such as a fine particle shape, a thin film shape or the like, and a fine particle shape is preferable. An average particle diameter of the negative electrode active material is not particularly limited, and its upper limit and lower limit are, for example, 50 μm, 45 μm, 40 μm, 35 μm, 30 μm, 25 μm, 20 μm, 15 μm, 10 μm, 5 μm, 4 μm, 3 μm, 2.9 μm, 2 μm, 1 μm, 0.5 μm, 0.1 μm, and so on. In one embodiment, the average particle diameter of the negative electrode active material is preferably 0.1 μm to 50 μm, more preferably 0.1 μm to 45 μm, even more preferably 1 μm to 10 μm, and particularly preferably about 5 μm. Handleability is good if the average particle diameter is 0.1 μm or more, and application of an electrode is easy if the average particle diameter is 50 μm or less. When the average particle diameter is within such a range, a uniform and thin coating film can be formed, which is therefore preferable.

In the disclosure, "particle diameter" means a maximum distance among distances between arbitrary two points on a contour line of a particle (the same applies hereinafter). In addition, in the disclosure, unless otherwise specified, "average particle diameter" means a value calculated as an average value of particle diameters of particles observed in several to several tens of visual fields using an observation means such as a scanning electron microscope (SEM) or a transmission electron microscope (TEM) or the like (the same applies hereinafter).

To remarkably exhibit the effect of the disclosure, the carbon material and/or the material alloyable with lithium is preferably contained in the negative electrode active material in an amount of 50% by mass or more, more preferably 80% by mass or more, even more preferably 90% by mass or more, and particularly preferably 100% by mass.

In one embodiment, from the viewpoint of increasing the battery capacity of the lithium-ion battery, the content of silicon or silicon oxide covered with a carbon layer in the negative electrode active material is preferably 5% by mass or more (for example, 10% by mass or more, 20% by mass or more, 30% by mass or more, 40% by mass or more, 50% by mass or more, 60% by mass or more, 70% by mass or more, 80% by mass or more, 90% by mass or more, or 100% by mass) with respect to 100% by mass of the negative electrode active material.

The upper limit and lower limit of the content of the component (A) with respect to 100% by mass of the above slurry are, for example, 15% by mass, 14% by mass, 12% by mass, 10% by mass, 9% by mass, 7% by mass, 5% by mass, 4% by mass, 3% by mass, 2% by mass, 1% by mass, 0.9% by mass, 0.6% by mass, 0.5% by mass, and so on. In one embodiment, the above content is preferably 0.5% by mass to 15% by mass.

The upper limit and lower limit of the content of the component (A) with respect to 100% by mass of the negative electrode active material in the above slurry are, for example, 15% by mass, 14% by mass, 11% by mass, 10% by mass, 9% by mass, 5% by mass, 4% by mass, 2% by mass, 1% by mass, and so on. In one embodiment, the above content is preferably about 1% by mass to 15% by mass.

The upper limit and lower limit of the content of the negative electrode active material with respect to 100% by mass of the above slurry are, for example, 65% by mass, 60% by mass, 55% by mass, 50% by mass, 45% by mass, 40% by mass, 35% by mass, 30% by mass, 25% by mass, 20% by mass, and so on. In one embodiment, the above content is preferably 20% by mass to 65% by mass with respect to 100% by mass of the above slurry.

The upper limit and lower limit of the content of water with respect to 100% by mass of the above slurry are, for example, 79% by mass, 75% by mass, 70% by mass, 65% by mass, 60% by mass, 55% by mass, 50% by mass, 45% by mass, 40% by mass, 35% by mass, 30% by mass, 25% by mass, 20% by mass, and so on. In one embodiment, the above content is preferably 20% by mass to 79% by mass.

A binder other than the water-soluble poly(meth)acrylamide (A) may be used in the above slurry. In one embodiment, the content of the water-soluble poly(meth)acrylamide (A) in all the binders is preferably 90% by mass or more (for example, 95% by mass or more, 99% by mass or more, 100% by mass or the like).

Slurry Viscosity Adjustment Solvent

A slurry viscosity adjustment solvent is not particularly limited, and may include a non-aqueous medium having a normal boiling point of 80° C. to 350° C. The slurry viscosity adjustment solvent may be used singly or in combination of two or more kinds thereof. Examples of the slurry viscosity adjustment solvent include: an amide solvent, such as N-methylpyrrolidone, dimethylformamide, N,N-dimethylacetamide or the like; a hydrocarbon solvent, such as toluene, xylene, n-dodecane, tetralin or the like; an alcohol solvent, such as methanol, ethanol, 2-propanol, isopropyl alcohol, 2-ethyl-1-hexanol, 1-nonanol, lauryl alcohol or the like; a ketone solvent, such as acetone, methyl ethyl ketone, cyclohexanone, phorone, acetophenone, isophorone or the like; an ether solvent, such as dioxane, tetrahydrofuran (THF) or the like; an ester solvent, such as benzyl acetate, isopentyl butyrate, methyl lactate, ethyl lactate, butyl lactate or the like; an amine solvent, such as o-toluidine, m-toluidine, p-toluidine or the like; a lactone, such as γ-butyrolactone, δ-butyrolactone or the like; a sulfoxide and sulfone solvent, such as dimethyl sulfoxide, sulfolane or the like; water, and so on. Among them, N-methylpyrrolidone is preferable from the viewpoint of application workability. The content of the above non-aqueous medium is not particularly limited, and is preferably 0% by mass to 10% by mass with respect to 100% by mass of the above slurry.

There has been an attempt to thermally crosslink a binder resin in an electrode by adding a crosslinker to a binder or slurry and coating the slurry on a current collector and drying the same (for example, a material described in WO 2015/098507). Accordingly, by crosslinking the binder resin in the electrode, an effect of suppressing expansion of the active material layer associated with a charge and discharge cycle is achieved. Also, in the above thermally crosslinkable binder aqueous solution, by thermally crosslinking the binder resin in the electrode, the effect of suppressing expansion of the active material layer associated with a charge and discharge cycle is achieved. The above thermally crosslinkable binder aqueous solution or a thermally crosslinkable slurry using this thermally crosslinkable binder aqueous solution has excellent storage stability. A method for evaluating storage stability is as follows. The solution viscosity of the prepared thermally crosslinkable binder aqueous solution or thermally crosslinkable slurry is measured by a B-type viscometer, followed by storage in an oven heated to 40° C. for 3 days. Then the solution viscosity after storage is again measured by the B-type viscometer, and whether there is a change in viscosity is confirmed, thereby performing the evaluation.

Additive

The above slurry may contain, as an additive, an agent that does not correspond to any of the component (A), the negative electrode active material, water, and the slurry viscosity adjustment solvent. The content of the additive is, for example, 0% by mass to 5% by mass, less than 1% by mass, less than 0.1% by mass, less than 0.01% by mass, 0% by mass, or the like, with respect to 100% by mass of the above slurry. Examples of the additive include those described above.

The above slurry may be prepared by a preparation method including the following steps: preparing the thermally crosslinkable binder aqueous solution for a lithium-ion battery, wherein the thermally crosslinkable binder aqueous solution contains the water-soluble poly(meth) acrylamide (A) that contains 2 mol % to 60 mol % of the constituent unit derived from the (meth)acrylamide group-containing compound (a), and 10 mol % to 50 mol % of the constituent unit derived from one or more unsaturated acids selected from the group consisting of unsaturated carboxylic acids and unsaturated sulfonic acids or an inorganic salt thereof (b), and 0.5 mol % to 30 mol % of the divalent or higher valent metal ion with respect to 100 mol % of the acid group contained in the component (b); and mixing the above thermally crosslinkable binder aqueous solution for a lithium-ion battery with the negative electrode active material.

Examples of the above slurry preparation method include a method for mixing an aqueous solution (the above thermally crosslinkable binder aqueous solution for a lithium-ion battery) of the component (A) with the negative electrode active material, and a method for separately mixing the component (A), the negative electrode active material, and water. The order of mixing in the above method is not particularly limited. Examples of a means of mixing the slurry include a ball mill, a sand mill, a pigment disperser, a Raikai mixer, an ultrasonic disperser, a homogenizer, a planetary mixer, a Hobart mixer and so on.

Lithium-Ion Battery Negative Electrode

The disclosure provides a negative electrode for a lithium-ion battery, obtained by applying the above thermally crosslinkable slurry for a lithium-ion battery negative electrode to a current collector, and drying and curing the same. The above electrode has a cured product of the above thermally crosslinkable slurry for a lithium-ion battery negative electrode on the current collector.

As the current collector, various known ones may be used without particular limitation. A material of the current collector is not particularly limited, and examples thereof include a metal material, such as copper, iron, aluminum, nickel, stainless steel, nickel-plated steel or the like, or a carbon material, such as carbon cloth, carbon paper or the like. The form of the current collector is not particularly limited. In the case of metal material, examples thereof include a metal foil, a metal cylinder, a metal coil, a metal plate and so on; in the case of carbon material, examples thereof include a carbon plate, a carbon thin film, a carbon cylinder and so on. Among them, when an electrode active material is used in the negative electrode, a copper foil is preferably used as the current collector because it is currently used in industrialized products.

The application means is not particularly limited, and examples thereof include a conventionally known coating device, such as a comma coater, a gravure coater, a micro gravure coater, a die coater, a bar coater and so on.

The drying means is also not particularly limited, and the temperature is preferably about 80° C. to 200° C., more preferably about 90° C. to 180° C. The atmosphere may be dry air or an inert atmosphere. By drying at an appropriate temperature, crosslinking of the water-soluble poly(meth) acrylamide (A) (which is the thermally crosslinkable binder for a lithium-ion battery) progresses, and the springback resistance associated with a charge and discharge cycle is exhibited.

The thickness of the negative electrode (cured product) is not particularly limited, and is preferably 5 μm to 300 μm, more preferably 10 μm to 250 μm. By setting the above range, a function of occluding and releasing sufficient lithium with respect to a high-density current value may be easily obtained.

Lithium-Ion Battery

The disclosure provides a lithium-ion battery including the above negative electrode for a lithium-ion battery. In one embodiment, the above battery includes an electrolyte solution, a separator, a positive electrode and so on. The above are not particularly limited.

Examples of the electrolyte solution include non-aqueous electrolytic solution in which a supporting electrolyte is dissolved in a non-aqueous solvent, and so on. In addition, a film forming agent may be contained in the above non-aqueous electrolytic solution.

As the non-aqueous solvent, various known ones may be used without particular limitation, and may be used singly or in combination of two or more thereof. Examples of the non-aqueous solvent include: a chain carbonate solvent, such as diethyl carbonate, dimethyl carbonate, ethyl methyl carbonate or the like; a cyclic carbonate solvent, such as ethylene carbonate, propylene carbonate, butylene carbonate or the like; a chain ether solvent, such as 1,2-dimethoxyethane or the like; a cyclic ether solvent, such as tetrahydrofuran, 2-methyltetrahydrofuran, sulfolane, 1,3-dioxolane or the like; a chain ester solvent, such as methyl formate, methyl acetate, methyl propionate or the like; a cyclic ester solvent, such as γ-butyrolactone, γ-valerolactone or the like; acetonitrile, and so on. Among them, a combination of mixed solvents containing a cyclic carbonate and a chain carbonate is preferable.

A lithium salt is used as the supporting electrolyte. As the lithium salt, various known ones may be used without particular limitation, and may be used singly or in combination of two or more thereof. Examples of the supporting electrolyte include $LiPF_6$, $LiAsF_6$, $LiBF_4$, $LiSbF_6$, $LiAlCl_4$, $LiClO_4$, $CF_3SO_3Li$, $C_4F_9SO_3Li$, $CF_3COOLi$, $(CF_3CO)_2NLi$, $(CF_3SO_2)_2NLi$, $(C_2F_5SO_2)_2NLi$ and so on. Among them, $LiPF_6$, $LiClO_4$ and $CF_3SO_3Li$, which are easily dissolved in a solvent and exhibit a high dissociation degree, are preferable. The higher the dissociation degree of the supporting electrolyte, the higher the lithium-ion conductivity. Therefore, the lithium-ion conductivity can be adjusted according to the type of the supporting electrolyte.

As the film forming agent, various known ones may be used without particular limitation, and may be used singly or in combination of two or more thereof. Examples of the film forming agent include: a carbonate compound, such as vinylene carbonate, vinyl ethylene carbonate, vinyl ethyl carbonate, methylphenyl carbonate, fluoroethylene carbonate, difluoroethylene carbonate or the like; an alkene sulfide, such as ethylene sulfide, propylene sulfide or the like; a sultone compound, such as 1,3-propane sultone, 1,4-butane sultone or the like; an acid anhydride, such as maleic anhydride, succinic anhydride or the like, and so on. The content of the film forming agent in the electrolyte solution is not particularly limited, and is 10% by mass or less, 8% by mass or less, 5% by mass or less, or 2% by mass or less, in order of preference. By setting the content to 10% by mass or less, the advantages of the film forming agent, such as suppression of initial irreversible capacity or improvement in low temperature characteristics and rate characteristics, may be easily achieved.

The separator is an article interposed between a positive electrode and a negative electrode, and is used to prevent a short circuit between the electrodes. Specifically, a porous separator such as a porous film or a nonwoven fabric or the like may be preferably used, which is impregnated with the aforementioned non-aqueous electrolytic solution for use. As a material of the separator, a polyolefin such as polyethylene, polypropylene or the like, or polyethersulfone or the like is used, and polyolefin is preferable.

As the positive electrode, various known ones may be used without particular limitation. Examples of the positive electrode include one obtained by preparing a slurry by mixing a positive electrode active material, a conductive aid, and a binder for a positive electrode with an organic solvent, applying the prepared slurry to a positive electrode current collector and drying and pressing, and so on.

Examples of the positive electrode active material include an inorganic positive electrode active material and an organic positive electrode active material. Examples of the inorganic positive electrode active material include a transition metal oxide, a composite oxide of lithium and a transition metal, a transition metal sulfide, and so on. Examples of the above transition metal include Fe, Co, Ni, Mn, Al and so on. Examples of the inorganic compound used in the positive electrode active material include: a lithium-containing composite metal oxide, such as $LiCoO_2$, $LiNiO_2$, $LiMnO_2$, $LiMn_2O_4$, $LiFePO_4$, $LiNi_{1/2}Mn_{3/2}O_4$, $LiCo_{1/3}Ni_{1/3}Mn_{1/3}O_2$, $Li[Li_{0.1}Al_{0.1}Mn_{1.8}]O_4$, $LiFeVO_4$, or the like; a transition metal sulfide, such as $TiS_2$, $TiS_3$, amorphous $MoS_2$ or the like; a transition metal oxide, such as $Cu_2V_2O_3$, amorphous $V_2O-P_2O_5$, $MoO_3$, $V_2O_5$, $V_6O_{13}$ or the like, and so on. These compounds may be partially element-substituted. Examples of the organic positive electrode active material include a conductive polymer, such as polyacetylene, poly-p-phenylene or the like. An iron-based oxide having poor electric conductivity may be used as an electrode active material covered with a carbon material by allowing a carbon source material to exist during reduction firing. These compounds may be partially element-substituted. Among them, from the viewpoints of practicality, electrical characteristics and long life, $LiCoO_2$, $LiNiO_2$, $LiMnO_2$, $LiMn_2O_4$, $LiFePO_4$, $LiNi_{1/2}Mn_{3/2}O_4$, $LiCo_{1/3}Ni_{1/3}Mn_{1/3}O_2$, and $Li[Li_{0.1}Al_{0.1}Mn_{1.8}]O_4$ are preferable.

Examples of the conductive aid include fibrous carbon such as vapor grown carbon fiber (VGCF), a carbon nanotube (CNT), carbon nanofiber (CNF), carbon black such as graphite particles, acetylene black, Ketjen black, furnace black, fine powders of Cu, Ni, Al, Si or alloys thereof having an average particle diameter of 10 μm or less, and so on.

As the binder for a positive electrode, various known ones may be used without particular limitation, and may be used singly or in combination of two or more thereof. Examples of the binder for a positive electrode include a fluorine-based resin (such as polyvinylidene fluoride, polytetrafluoroethylene or the like), a polyolefin (such as polyethylene, polypropylene or the like), a polymer having an unsaturated bond (such as styrene-butadiene rubber, isoprene rubber, butadiene rubber or the like), an acrylic acid-based polymer (such as an acrylic acid copolymer, a methacrylic acid copolymer or the like), and so on.

Examples of the positive electrode current collector include an aluminum foil, a stainless steel foil and so on.

The form of the above lithium-ion battery is not particularly limited. Examples of the form of the lithium-ion battery include a cylinder type in which a sheet electrode and a separator are formed in a spiral shape, a cylinder type having an inside-out structure in which a pellet electrode and a separator are combined, a coin type in which a pellet electrode and a separator are laminated, and so on. In addition, by accommodating the battery of these forms in an arbitrary exterior case, the battery can be used in an arbitrary shape such as a coin shape, a cylindrical shape, a square shape or the like.

A method for producing the above lithium-ion battery is not particularly limited, and the lithium-ion battery may be assembled by an appropriate procedure depending on the structure of the battery. Examples of the method for producing a lithium-ion battery include a method described in Japanese Patent Laid-Open No. 2013-089437, and so on. The battery can be produced in the following manner. A negative electrode is placed on an exterior case, an electrolytic solution and a separator are provided thereon, a positive electrode is further placed so as to face the negative electrode, and the positive electrode is fixed with a gasket and a sealing plate.

EXAMPLES

Hereinafter, the disclosure will be specifically described through examples and comparative examples. However, the above description of the preferred embodiments and the following examples are provided for illustration only and not for limiting the disclosure. Therefore, the scope of the disclosure is not limited to the embodiments or examples specifically described herein, but only by the claims. In addition, in each of the examples and comparative examples, unless otherwise specified, numerical values such as part, % and so on are based on mass.

1. Preparation of Component (A)

Example 1-1

In a reactor equipped with a stirrer, a thermometer, a reflux condenser and a nitrogen gas introduction pipe, 1,200 g of ion-exchanged water, 100 g (0.70 mol) of 50% acrylamide aqueous solution, 63.6 g (0.70 mol) of 80% acrylic acid, 70.1 g (0.60 mol) of 2-hydroxyethyl acrylate and 0.32 g (0.0020 mol) of sodium methallylsulfonate were put, and after oxygen in the reaction system was removed through nitrogen gas, the resultant was heated to 55° C. 1.7 g of 2,2'-azobis-2-amidinopropane dihydrochloride (product name "NC-32" made by NIPPOH CHEMICALS CO., LTD.) and 15 g of ion-exchanged water were put therein, and the resultant was heated to 80° C. and reacted for 3 hours. After that, 52.9 g (0.63 mol) of 48% sodium hydroxide aqueous solution as a neutralizer and 0.26 g (0.0035 mol) of calcium hydroxide were added and stirred, and ion-exchanged water was added so as to achieve a solid content concentration of 13%, and an aqueous solution containing a water-soluble polyacrylamide was obtained. The pH of this solution at 25° C. was 6.0.

In the Example 1 series except for Example 1-1, an aqueous solution containing a water-soluble poly(meth)acrylamide was prepared in the same manner as in Example 1-1, except that the monomer composition and the amount of the neutralizer in Example 1-1 were changed to those shown in Table 1.

Comparative Example 1-1

In a reactor equipped with a stirrer, a thermometer, a reflux condenser and a nitrogen gas introduction pipe, 1,200 g of ion-exchanged water, 100 g (0.70 mol) of 50% acrylamide aqueous solution, 63.6 g (0.70 mol) of 80% acrylic acid, 70.1 g (0.60 mol) of 2-hydroxyethyl acrylate and 0.32 g (0.0020 mol) of sodium methallylsulfonate were put, and after oxygen in the reaction system was removed through nitrogen gas, the resultant was heated to 55° C. 1.7 g of 2,2'-azobis-2-amidinopropane dihydrochloride (product name "NC-32" made by NIPPOH CHEMICALS CO., LTD.) and 15 g of ion-exchanged water were put therein, and the resultant was heated to 80° C. and reacted for 3 hours. After that, 52.9 g (0.63 mol) of 48% sodium hydroxide aqueous solution as a neutralizer was added and stirred, and ion-exchanged water was added so as to achieve a solid content concentration of 13%, and an aqueous solution containing a water-soluble polyacrylamide was obtained. The pH of this solution at 25° C. was 6.0.

In the Comparative Example 1 series except for Comparative Example 1-1, an aqueous solution containing a water-soluble poly(meth)acrylamide was prepared in the same manner as in Comparative Example 1-1, except that the monomer composition and the amount of the neutralizer in Comparative Example 1-1 were changed to those shown in Table 1.

B-Type Viscosity

The viscosity of each binder aqueous solution was measured at 25° C. under the following conditions using a B-type viscometer (product name "B-type Viscometer Model BM" made by Toki Sangyo Co., Ltd.).
No. 3 rotor was used at a rotational speed of 12 rpm.

Weight Average Molecular Weight

The weight average molecular weight was calculated as a value in terms of polyacrylic acid as measured by gel permeation chromatography (GPC) under a 0.2 M phosphate buffer/acetonitrile solution (90/10, PH 8.0). HLC-8220 (made by Tosoh Corporation) was used as a GPC device, and SB-806M-HQ (made by SHODEX) was used as a column.

pH

The pH of each binder aqueous solution was measured at 25° C. using a glass electrode pH meter (product name "Handy pH Meter D-52" made by Horiba, Ltd.).

Gel Fraction 10 g of a thermally crosslinkable binder aqueous solution for a lithium-ion battery, which contained the water-soluble poly(meth)acrylamide (A), was put in an ointment can (product name "Ointment Can made of tinplate" made by SOGO LABORATORY GLASS WORKS CO., LTD.), and after drying at 120° C. for 4 hours by a circulating air dryer (product name "Blower Constant Temperature Dryer DSR420DA" made by Advantec Toyo Kaisha, Ltd.), a solid resin after thermal crosslinking was obtained. The mass of the solid resin was accurately measured at 25° C. by a mass meter (product name "Standard Balance CPA324S" made by Sartorius Japan K.K.). The measured solid resin was transferred to a container (300 mL beaker) containing 150 mL of pure water, and after immersion in water at 25° C. for 3 hours under stirring by a magnetic stirrer (product name "Powerful Magnetic Stirrer RCX-1000D" made by Tokyo Rikakikai Co., Ltd.), the resultant was filtered under reduced pressure by filter paper ("No. 50B" made by Kiriyama Glass Works Co.) using a Kiriyama funnel (product name "KIRIYAMA ROHTO SB-60" made by Kiriyama Glass Works Co.) and a suction bell (product name "Suction Bell VKB-200" made by Kiriyama Glass Works Co.). After that, an insoluble residue remaining on the filter paper was dried at 120° C. for 3 hours by the above circulating air dryer, followed by an accurate measurement of the mass of the insoluble residue by the above mass meter at 25° C., and a gel fraction of the resin after thermal crosslinking of the water-soluble binder for a battery was calculated from the following equation:

Gel fraction (%)={insoluble residue (g)/mass (g) of solid resin}×100

TABLE 1

| | (Meth)acrylamide group-containing compound (a) | | One or more unsaturated acids selected from group consisting of unsaturated carboxylic acids and unsaturated sulfonic acids or inorganic salt thereof (b) | | Hydroxyl group-containing (meth)acrylic ester (c) | | Other copolymerizable monomer (d) | |
|---|---|---|---|---|---|---|---|---|
| | AM (mol %) | DMAA (mol %) | AA (mol %) | ATBS (mol %) | HEA (mol %) | HBA (mol %) | AN (mol %) | SMAS (mol %) |
| Example 1-1 | 35.0 | | 35.0 | | 29.9 | | | 0.1 |
| Example 1-2 | 25.0 | | 45.0 | | 29.9 | | | 0.1 |
| Example 1-3 | 3.0 | | 40.0 | | 56.9 | | | 0.1 |

TABLE 1-continued

| | | | | | | | | |
|---|---|---|---|---|---|---|---|---|
| Example 1-4 | 3.9 | 32.0 | 20.0 | | 44.0 | | | 0.1 |
| Example 1-5 | 38.9 | | 25.0 | | 16.0 | | 20.0 | 0.1 |
| Example 1-6 | 57.9 | | 20.0 | | | 22.0 | | 0.1 |
| Example 1-7 | 34.9 | | 4.0 | 36.0 | 25.0 | | | 0.1 |
| Comparative Example 1-1 | 35.0 | | 35.0 | | 29.9 | | | 0.1 |
| Comparative Example 1-2 | 56.9 | | 10.0 | | 33.0 | | | 0.1 |
| Comparative Example 1-3 | 35.0 | | 35.0 | | 29.9 | | | 0.1 |

| | Neutralizer Numerical value is the amount with respect to 100 mol % of an acid group contained in component (b) | | | B-type viscosity [mPa · s] | Molecular weight (Mw) | pH | Gel fraction (%) |
|---|---|---|---|---|---|---|---|
| | NaOH (mol %) | LiOH (mol %) | Ca(OH)$_2$ (mol %) | | | | |
| Example 1-1 | 90 | | 0.5 | 3,000 | 700,000 | 6.0 | 75 |
| Example 1-2 | 30 | | 30.0 | 3,700 | 700,000 | 6.0 | 75 |
| Example 1-3 | 80 | | 0.5 | 6,000 | 850,000 | 5.7 | 70 |
| Example 1-4 | 75 | | 1.5 | 5,000 | 750,000 | 5.1 | 60 |
| Example 1-5 | | 90 | 1.0 | 3,000 | 650,000 | 6.4 | 80 |
| Example 1-6 | 80 | | 1.0 | 5,000 | 750,000 | 5.8 | 78 |
| Example 1-7 | 90 | | 1.0 | 1,500 | 600,000 | 5.4 | 62 |
| Comparative Example 1-1 | 90 | | 0.0 | 3,000 | 700,000 | 6.0 | 75 |
| Comparative Example 1-2 | 90 | | 0.5 | 2,500 | 650,000 | 5.4 | 75 |
| Comparative Example 1-3 | | | 45.0 | 4,000 | 840,000 | 5.7 | 75 |

AM: Acrylamide ("50% Acrylamide" made by Mitsubishi Chemical Corporation)
DMAA: N,N-dimethylacrylamide ("DMAA" made by KJ Chemicals Corporation)
AA: Acrylic acid ("80% Acrylic Acid" made by Osaka Organic Chemical Industry Ltd.)
ATBS: Acrylamide t-butylsulfonic acid ("ATBS" made by Toagosei Company, Limited)
HEA: 2-hydroxyethyl acrylate ("HEA" made by Osaka Organic Chemical Industry Ltd.)
HBA: 4-hydroxybutyl acrylate ("4HBA" made by Mitsubishi Chemical Corporation)
AN: Acrylonitrile ("Acrylonitrile" made by Mitsubishi Chemical Corporation)
SMAS: Sodium methallyl sulfonate
NaOH: Sodium hydroxide ("48% Sodium Hydroxide Solution" made by Kanto Chemical Co., Inc.)
LiOH: Lithium hydroxide ("Lithium Hydroxide Monohydrate" made by FUJIFILM Wako Pure Chemical Corporation)
Ca(OH)$_2$: Calcium hydroxide ("Calcium Hydroxide" made by KISHIDA CHEMICAL Co., Ltd.)

2. Preparation of Slurry, Production of Cell and Evaluation

Example 2-1

The thermally crosslinkable binder aqueous solution for a lithium-ion battery as obtained in Example 1-1, which contained the water-soluble poly(meth)acrylamide (A), was mixed in an amount of 5 parts by mass in terms of solid content with 20 parts by mass of silicon monoxide particles ("CC Powder" made by OSAKA Titanium technologies Co., Ltd.) having a D50 (median diameter) of 5 μm and 80 parts by mass of natural graphite (product name "Z-5F" made by Ito Graphite Co., Ltd.) using a commercially available rotation/revolution mixer ("Awatori Rentaro" made by THINKY CORPORATION) in a container dedicated to the mixer. Ion-exchanged water was added thereto so as to achieve a solid content concentration of 40%, and the container was set in the above mixer. Next, after kneading at 2,000 rpm for 10 minutes, defoaming was performed for 1 minute and a slurry was obtained.

In the Example 2 series except for Example 2-1 and the comparative examples, a slurry was prepared in the same manner as in Example 2-1, except that the composition in Example 2-1 was changed to those shown in Table 2.

Test for Storage Stability of Electrode Slurry

The viscosity (unit: mPa·s) of the electrode slurry was measured by a B-type viscometer and then stored in an oven heated to 40° C. for 3 days. After storage, the viscosity was measured again by the B-type viscometer. A change in viscosity was calculated by the following equation and was evaluated according to the following evaluation criteria.

Change in viscosity (%)=(viscosity of electrode slurry after storage)/(viscosity of electrode slurry before storage)×100

A: Less than 110%
B: 110% or more and less than 120%
C: 120% or more and less than 130%
D: 130% or more Production of Electrode The above slurry for a lithium-ion battery was uniformly applied to a surface of a current collector composed of copper foil by a doctor blade method so that a film thickness after drying would be 170 μm. After drying at 150° C. for 30 minutes, the resultant was subjected to a heating treatment at 150° C. in vacuum for 120 minutes, and an electrode was obtained. After that, by press processing by a roll press machine to achieve a film (electrode active material layer) density of 1.5 g/cm³, an electrode was obtained.

Evaluation of Electrode Adhesion

The electrode adhesion was evaluated as follows.
A test piece of 2 cm in width×10 cm in length was cut out from the electrode and fixed with a coating surface facing up. Next, an adhesive tape ("CELLOTAPE™" made by NICHIBAN Co., Ltd.) (specified in JIS Z1522) of 15 mm in width was attached while being pressed onto a surface of an active material layer of the test piece, and then the stress when the adhesive tape was peeled off from one end of the test piece at a speed of 30 mm/min in the 180° direction was measured using a tensile tester ("TENSILON RTM-100" made by A&D Company, Limited) at 25° C. The measurement was performed twice, the measured stress was converted into a value per width of 15 mm, and an average value thereof was calculated as peel strength. The higher the peel strength, the higher the adhesion strength between the current collector and the active material layer or the binding property between the active materials, indicating that the active material layer is less likely to be peeled from the current collector or the active materials are less likely to be peeled from each other.

Assembly of Lithium Half-Cell

In an argon-purged glove box, the above electrode was punched and formed to have a diameter of 16 mm, and the resultant was placed inside a packing above an aluminum lower lid of a test cell (made by Nippon Tomcell Co., Ltd.). Next, a separator (product name "Selion P2010" made by CS Tech Co., Ltd.) composed of a polypropylene porous film punched out to a diameter of 24 mm was placed.

Further, after 500 μL of electrolytic solution was poured in so that no air could enter, a commercially available metallic lithium foil punched and formed into a size of 16 mm was placed, and an exterior body of the test cell was fastened and sealed with screws. Thereby, a lithium half-cell was assembled. The electrolytic solution used here was a solution in which $LiPF_6$ was dissolved at a concentration of 1 mol/L in a solvent having a mass ratio of ethylene carbonate to ethyl methyl carbonate of 1/1.

Charge and Discharge Measurement

The lithium half-cell was put in a constant temperature bath set to 25° C. and underwent charging and discharging as follows. The charging was started at a constant current (0.1 C) and was completed (cutoff) when the voltage reached 0.01 V. Next, the discharging was started at a constant current (0.1 C) and was completed (cutoff) when the voltage reached 1.0 V. The above charging and discharging were repeated 30 times.
In the above measurement conditions, "1 C" indicates a current value at which a cell having a certain electric capacity is discharged at a constant current and the discharging is completed in 1 hour. For example, "0.1 C" means a current value at which it takes 10 hours to complete discharging, and "10 C" means a current value at which it takes 0.1 hour to complete discharging.

Discharge Capacity Retention Rate

The discharge capacity retention rate was calculated from the following equation:

Discharge capacity retention rate={(discharge capacity at 30th cycle)/(discharge capacity at 1st cycle)}×100 (%)

Measurement of Springback Ratio

After the charge and discharge cycle test was carried out 30 cycles at room temperature (25° C.), the lithium half-cell was disassembled and the thickness of the electrode was measured. A springback ratio of the electrode was calculated by the following equation:

Springback ratio={(electrode thickness after 30 cycles−current collector thickness)/(electrode thickness before charging and discharging−current collector thickness)}×100−100 (%)

TABLE 2

|  | Negative electrode active material | | Thermally crosslinkable binder aqueous solution | | Storage stability of electrode slurry | Electrode adhesion (N/m) | Discharge capacity retention rate (%) | Springback ratio (%) |
| --- | --- | --- | --- | --- | --- | --- | --- | --- |
|  | Silicon monoxide Part by mass | Natural graphite Part by mass | Name | Part by mass | | | | |
| Example 2-1 | 20 | 80 | Example 1-1 | 5 | A | 6.7 | 80 | +35 |
| Example 2-2 | 50 | 50 | Example 1-2 | 7 | A | 4.0 | 65 | +51 |
| Example 2-3 | 50 | 50 | Example 1-3 | 7 | A | 7.3 | 71 | +43 |
| Example 2-4 | 20 | 80 | Example 1-4 | 5 | B | 6.3 | 77 | +45 |
| Example 2-5 | 20 | 80 | Example 1-5 | 5 | B | 6.5 | 80 | +41 |
| Example 2-6 | 20 | 80 | Example 1-6 | 5 | A | 7.4 | 78 | +39 |
| Example 2-7 | 0 | 100 | Example 1-7 | 3 | A | 5.8 | 92 | +25 |
| Comparative Example 2-1 | 20 | 80 | Comparative Example 1-1 | 5 | A | 3.2 | 75 | +37 |
| Comparative Example 2-2 | 20 | 80 | Comparative Example 1-2 | 5 | C | 1.1 | 60 | +45 |
| Comparative Example 2-3 | 20 | 80 | Comparative Example 1-3 | 5 | C | 0.1 | 55 | +48 |

As is clear from Table 2, the slurry prepared using the binder aqueous solution of the examples and the lithium half-cell produced from this slurry were both evaluated as satisfactory in the evaluations of storage stability of slurry, electrode adhesion, discharge capacity retention rate and springback ratio.

What is claimed is:

1. A thermally crosslinkable binder aqueous solution for a lithium-ion battery, containing:
    a water-soluble poly(meth)acrylamide (A), consisting of:
        2 mol % to 60 mol % of a constituent unit derived from a (meth)acrylamide group-containing compound (a),
        15 mol % to 50 mol % and less than 50 mass % of a constituent unit derived from one or more unsaturated acids selected from the group consisting of unsaturated carboxylic acids and unsaturated sulfonic acids or an inorganic salt thereof (b),
        15 mol % to 75 mol % of a constituent unit derived from a hydroxyl group-containing (meth)acrylic ester (c),
        less than 40 mol % of a constituent unit derived from unsaturated phosphoric acid or a salt thereof,
        less than 40 mol % of a constituent unit derived from a hydroxyl group-free unsaturated carboxylic ester, and
        less than 40 mol % of a constituent unit derived from an α,β-unsaturated nitrile; and
    0.5 mol % to 30 mol % of a divalent or higher valent metal ion with respect to 100 mol % of an acid group contained in the component (b).

2. The thermally crosslinkable binder aqueous solution for a lithium-ion battery according to claim 1, wherein the divalent or higher valent metal ion is a calcium ion.

3. A the many crosslinkable slurry for a lithium-ion battery negative electrode, containing the thermally crosslinkable binder aqueous solution for a lithium-ion battery according to claim 1 and a negative electrode active material.

4. A negative electrode for a lithium-ion battery, obtained by applying the thermally crosslinkable slurry for a lithium-ion battery negative electrode according to claim 3 to a current collector, and drying and curing the same.

5. A lithium-ion battery, comprising the negative electrode for a lithium- ion battery according to claim 4.

6. A thermally crosslinkable slurry for a lithium-ion battery negative electrode, containing the thermally crosslinkable binder aqueous solution for a lithium-ion battery according to claim 2 and a negative electrode active material.

7. The thermally crosslinkable binder aqueous solution for a lithium-ion battery according to claim 1, wherein the constituent unit derived from the (meth)acrylamide group-containing compound (a) in the water-soluble poly(meth)acrylamide (A) is more than 20 mol % to 60 mol %.

8. The thermally crosslinkable binder aqueous solution for a lithium-ion battery according to claim 1, wherein the constituent unit derived from the hydroxyl group-containing (meth)acrylic ester (c) in the water-soluble poly(meth)acrylamide (A) is more than 20 mol % to 75 mol %.

9. The thermally crosslinkable binder aqueous solution for a lithium-ion battery according to claim 1, wherein a ratio of amount of substance [amount of substance of component (a)/amount of substance of component (c)] between the component (a) and the component (c) is 0.5 to 4.

* * * * *